United States Patent
Le Clech et al.

(10) Patent No.: US 10,680,934 B2
(45) Date of Patent: Jun. 9, 2020

(54) MULTIPOINT-TO-MULTIPOINT RADIO DATA TRANSPORT

(71) Applicant: ORANGE, Paris (FR)

(72) Inventors: Fabien Le Clech, Issy les Moulineaux (FR); Anna Pizzinat, Verrieres le Buisson (FR)

(73) Assignee: Orange, Paris (FR)

( * ) Notice: Subject to any disclaimer, the term of this patent is extended or adjusted under 35 U.S.C. 154(b) by 169 days.

(21) Appl. No.: 15/102,524

(22) PCT Filed: Nov. 27, 2014

(86) PCT No.: PCT/FR2014/053070
§ 371 (c)(1),
(2) Date: Jun. 7, 2016

(87) PCT Pub. No.: WO2015/086945
PCT Pub. Date: Jun. 18, 2015

(65) Prior Publication Data
US 2016/0359730 A1 Dec. 8, 2016

(30) Foreign Application Priority Data
Dec. 13, 2013 (FR) ...................... 13 62561

(51) Int. Cl.
*H04L 12/761* (2013.01)
*H04W 92/12* (2009.01)
(Continued)

(52) U.S. Cl.
CPC .......... *H04L 45/16* (2013.01); *H04L 47/2483* (2013.01); *H04W 92/12* (2013.01); *H04W 88/08* (2013.01); *H04W 88/12* (2013.01)

(58) Field of Classification Search
CPC ...................................................... H04L 45/16
(Continued)

(56) References Cited

U.S. PATENT DOCUMENTS

2007/0116046 A1 5/2007 Liu et al.
2009/0103504 A1* 4/2009 Inumaru ............. H04L 12/5602
370/338
(Continued)

FOREIGN PATENT DOCUMENTS

EP 2373116 A1 5/2011
EP 2469940 A2 6/2012
EP 2512202 A1 10/2012

OTHER PUBLICATIONS

CPRI Specification V5.0, Common Public Radio Interface (CPRI); Interface Specification, Sep. 21, 2011.

*Primary Examiner* — Kodzovi Acolatse
*Assistant Examiner* — Abdeltif Ajid
(74) *Attorney, Agent, or Firm* — Haverstock & Owens LLP

(57) ABSTRACT

The invention concerns a system for multipoint-to-multipoint radio data transport, comprising a device for switching samples of digitised radio data called samples, transmitted by a device for the digital processing of antenna signals called antenna device (RU1, RU2), via a first data link (DL11, DL12), to a plurality of recipient antenna controller devices (DU1, DU2) identified by a respective plurality of controller identifiers, the switching device (DD) comprising the following modules: interception of first data frames (T11, T12) from the antenna device and intended for the plurality of controller devices, the first frames comprising the samples, demultiplexing the samples from the intercepted first data frames, extracting the controller identifiers from the intercepted first data frames, grouping together the demultiplexed samples by controller identifier, multiplexing the samples by group in second data frames (T21, T22), a second data frame being associated with a controller identifier, transmitting the second data frames via a plurality of (Continued)

second data links (DL21, DL22) associated respectively with the plurality of recipient antenna controller devices.

6 Claims, 3 Drawing Sheets

(51) Int. Cl.
*H04L 12/851* (2013.01)
*H04W 88/08* (2009.01)
*H04W 88/12* (2009.01)

(58) Field of Classification Search
USPC .......................................................... 370/390
See application file for complete search history.

(56) References Cited

U.S. PATENT DOCUMENTS

| | | | |
|---|---|---|---|
| 2009/0239477 A1* | 9/2009 | Yamamoto | H04W 8/26 455/68 |
| 2009/0257450 A1 | 10/2009 | Sirigiri et al. | |
| 2012/0057572 A1 | 3/2012 | Evans et al. | |
| 2012/0128151 A1* | 5/2012 | Boehm | G11B 20/00086 380/42 |
| 2014/0355991 A1* | 12/2014 | Cameirao | H04B 10/2575 398/79 |
| 2016/0277964 A1* | 9/2016 | Xu | H04W 28/065 |

* cited by examiner

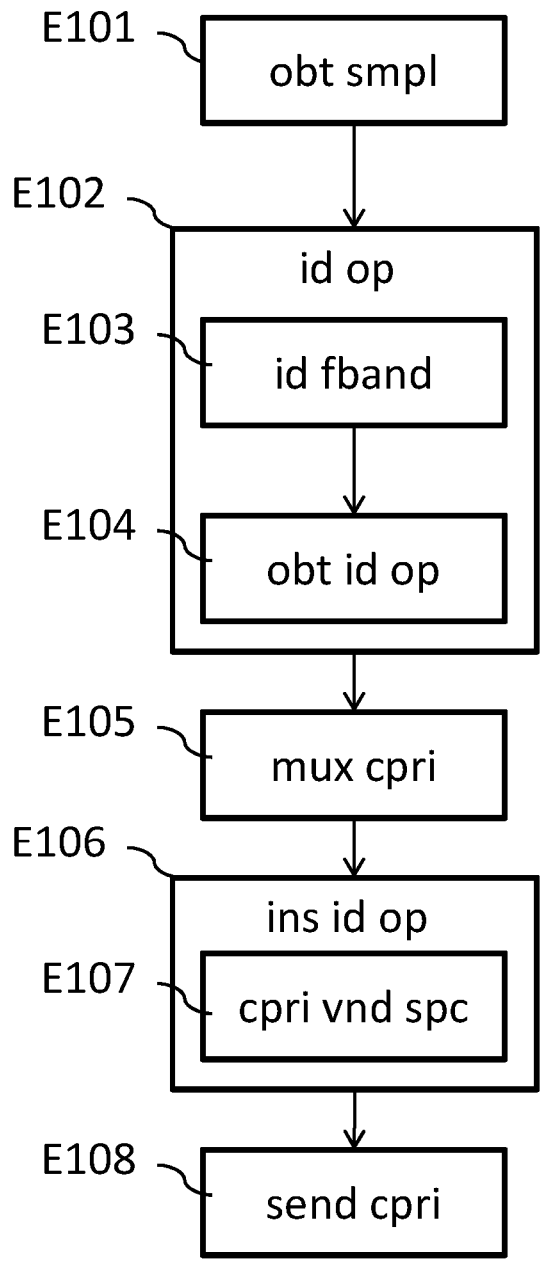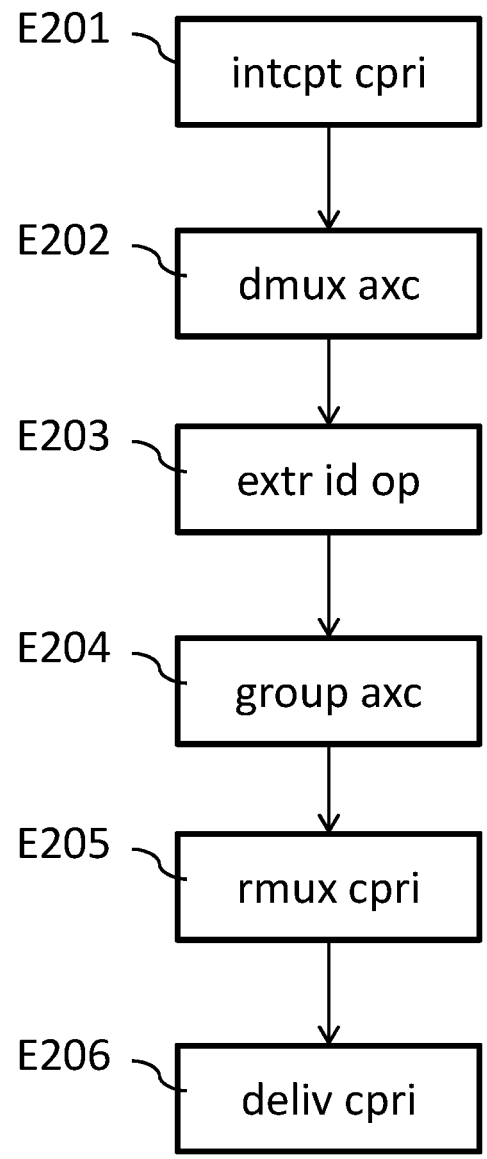

MULTIPOINT-TO-MULTIPOINT RADIO DATA TRANSPORT

FIELD OF THE INVENTION

The application for invention lies in the field of mobile access networks, and more particularly in the field of the collection and distribution of radio data between the radio units in proximity to the antennas and the antenna controller equipment items.

PRIOR ART

In a traditional mobile access network architecture, a base station is installed for example on a mast or a building and comprises a radio unit (RU) for each antenna, and a control unit (or digital unit, DU) for each radio unit, in proximity to the antenna, for example at the base of the mast or in a technical room of the building.

The radio unit of a base station is, among other things, responsible for the reception and transmission of the radio signal from and to the antenna, and for its digitization for transmission to the control unit.

The radio units are also called radiofrequency heads, or remote radio heads (RRH) or radio equipment (RE). For clarity and simplicity, they are hereinafter called antenna devices, it being understood that this designation covers the device allowing the antenna to be connected to a control unit.

The control unit of a base station is, among other things, responsible for the processing of the data contained in the digital signal processed by the radio unit and for guaranteeing the connection to a telecommunication network.

The control units are also called baseband unit (BBU) or remote equipment control (REC). For clarity and simplicity, they are hereinafter called antenna controller devices, or more simply antenna controllers, it being understood that this designation covers the device allowing the control unit to be connected to an antenna device.

The connection between the antenna device and the antenna controller is made by a digitized radio data link borne by an optical fiber or a wireless radio link and using the CPRI (Common Public Radio Interface), OBSAI (Open Base Station Architecture Initiative) or ORI (Open Radio Equipment Interface; ORI being based on CPRI) protocol. This link is hereinafter called CPRI link because the CPRI protocol is the most widely used, it being understood that this designation covers the other protocols also.

With the proliferation of mobile access networks and the attendant changes to the standards, the mobile communications operators have a tendency to distance the controllers from the antenna sites and therefore from the antenna devices, depending on criteria which are specific to them. For example, one operator may group together in a single plant, away from the antennas, some of its antenna controllers serving the antennas of several antenna sites. Furthermore, since the antennas and the antenna devices can be shared between a number of operators, the need emerges to connect an antenna device to several controllers, one controller per operator, in premises that may or may not be distinct, by as many distinct CPRI links. The "CPRI specification v5.0" standard stipulates, in section 2.3, that an antenna device can be served by a plurality of antenna controller devices, by relying on point-to-point CPRI links between the antenna device and each of the antenna controller devices.

This multiplicity of CPRI links relying on as many optical fibers or wireless radio links represents a cost, combined with the increasing distance between controllers and antennas, imposes constraints on the organization of the sites hosting the antenna controllers, which are all the more of a nuisance when the controllers are managed by different operators.

One of the aims of the invention is to remedy these drawbacks in the prior art.

SUMMARY OF THE INVENTION

The invention improves the situation using a device for switching digitized radio data samples called samples, transmitted by a digital antenna signal processing device called antenna device, through a first data link, to a plurality of recipient antenna controller devices identified by a respective plurality of controller identifiers, the switching device comprising the following modules:
  interception of first data frames from the antenna device and intended for the plurality of controller devices, the first frames comprising the samples,
  demultiplexing of the samples of the intercepted first data frames,
  extraction of the controller identifiers from the intercepted first data frames,
  grouping together of the demultiplexed samples by controller identifier,
  multiplexing of the samples by group in second data frames, a second data frame being associated with a controller identifier,
  transmission of the second data frames via a plurality of second data links associated respectively with the plurality of recipient antenna controller devices.

The switching device according to the invention resolves the problems of the prior art linked to the multiplicity of links between an antenna device and the controller devices, and the increasing distance between them, by remotely siting the point where the data frames have to be switched to the correct recipient controller device. In effect, by virtue of the invention, the data frames transmitted by the antenna device are intercepted by the switching device which is responsible for transmitting them to the correct recipient controller device.

In this way, the location of the controller devices is no longer constrained by that of the antenna device. It is sufficient to locate the switching device according to the location of the controller devices.

The invention relates also to a digital antenna signal processing device, called antenna device, transmitting digitized radio data samples, called samples, to a plurality of recipient antenna controller devices identified by a respective plurality of controller identifiers, the antenna device comprising the following modules:
  obtaining of the samples,
  identification of their respective controller device,
  multiplexing of the samples in first digitized radio data frames, called first data frames,
  insertion in the first data frames of the recipient controller identifiers, corresponding to the multiplexed samples,
  transmission of the first frames to the plurality of antenna controller devices via a first data link to the plurality of recipient antenna controller devices.

In the CPRI standard, the digitized data samples are called "AxC" (Antenna-Carrier) and represent a quantity of data in digitized form, as transported in analog form by one and the same carrier between an antenna and a mobile terminal, that is to say transported in the frequency band or bands allocated to the mobile terminal operator. Each sample therefore corresponds to a data block intended to be transported in a radio link between an antenna and a mobile terminal, within a frequency band specifically assigned to a mobile operator.

It will be recalled that the invention relates to the part between antenna and network, and not between antenna and mobile terminals. In a multi-operator environment, according to the prior art described in the CPRI standard, before transmitting data frames, an antenna device has to sort the samples in order to not mix them between several operators (between several carriers), because the antenna controller device of each operator, which is the recipient of these frames and is linked by a distinct CPRI link to the antenna device, does not perform this sort itself.

According to the invention, the antenna device does not sort the AxC samples and does not transmit them over dedicated links to several controller devices, but multiplexes them in order for them to be mixed in data frames which can thus be transmitted over a single link, thus avoiding the need to use a plurality of separate links.

These frames, called "CPRI frames" in the standard, are of the same format as those which are exchanged between an antenna device and a controller device according to the prior art, which minimizes the modifications needed in the devices at each end of the link.

The invention relates also to a transmission system for digitized radio data samples called samples, between at least one digital antenna processing device, called antenna device, and a plurality of recipient antenna controller devices identified respectively by a controller identifier, the system comprising at least one antenna device such as that which has just been described, and one switching device such as that which has just been described.

In the transmission system according to the invention, the antenna device is connected to a switching device which is itself connected to the different dedicated antenna controller devices for each operator.

The link between the antenna device and this switching device, and the frames that it transports, that is to say CPRI frames, are of the same kind as the direct links with the antenna controller devices according to the prior art.

Likewise, the links between the switching device and each of the antenna controller devices, as well as the frames that they transport, that is to say CPRI frames, are of the same kind as the direct links with the antenna controller devices according to the prior art.

No modification is therefore needed in the antenna controller devices, which can continue to operate as if they had a direct point-to-point link with the antenna device.

By virtue of the first link between the antenna device and the switching device, it is therefore easy to remotely site to a great distance the splitting point to the different antenna controller devices, and therefore to choose for the latter a location distant from the antennas, without any modification being necessary at their level.

Furthermore, such a transmission system according to the invention further makes it possible to connect more than one antenna device to the plurality of antenna controllers, still without any modification being necessary at their level, in the case where one or more of the antenna controllers are able to control a number of antennas at the same time, as is also provided for in the "CPRI specification v5.0" standard. In other words, the system according to the invention also allows for the creation and use of a multipoint-to-multipoint network between antenna devices and antenna controllers.

According to one aspect of the invention, the transmission system further comprises first and second transport modules, the first transport module being arranged to:
receive the first data frames through at least one first data link,
encapsulate the first data frames in transport frames,
transmit the transport frames to the second transport module through a transport link,
and the second transport module being arranged to:
receive the transport frames through the transport link,
obtain the first data frames by de-encapsulation from the transport frames,
deliver the de-encapsulated first data frames to the switching device.

By virtue of this aspect, the constraints of location of the antenna controller devices, specific to the CPRI links, disappear completely. In effect, by encapsulating the CPRI frames in frames of higher level, the CPRI frames can take a path in an existing transport network, such as an Ethernet network or a G.709 optical data network, for example a path between a first transport equipment item close to the antenna device and a second transport equipment item comprising the switching device. For that, it is sufficient for the first data link to be set up between the antenna device and a transport device which is a point of entry to this transport network, and for the switching device to be adjacent to another transport device which is a point of exit from this transport network.

Thus, a greater flexibility is allowed in choosing the appropriate locations for the antenna controller devices, even very far from the antennas. This advantage is obtained both for a point-to-multipoint system, that is to say one antenna device to a plurality of control devices, and for a multipoint-to-multipoint system, that is to say a plurality of antenna devices to a plurality of control devices.

The invention relates also to a communication equipment item, comprising an interface with a transport network, a switching device such as that which has just been described and a transport module arranged to
receive transport frames through the interface,
obtain data frames by de-encapsulation from the transport frames,
deliver the de-encapsulated data frames to the switching device.

The invention relates also to a method for switching digitized radio data samples called samples, transmitted by a digital antenna signal processing device called antenna device, to a plurality of recipient antenna controller devices identified by a respective plurality of controller identifiers, the switching method comprising the following steps:
interception of first data frames from the antenna device and intended for the plurality of controller devices, the first frames comprising the samples,
demultiplexing of the samples of the intercepted first data frames,
extraction of the controller identifiers from the intercepted first data frames,
grouping together of the demultiplexed samples by controller identifier,
multiplexing of the samples by group in second data frames, a second data frame being associated with a controller identifier,
transmission of the second data frames via a plurality of second data links associated respectively with the plurality of recipient antenna controller devices.

The switching device is capable of implementing the switching method which has just been described, in all its embodiments.

The invention relates also to a digital antenna signal processing method, for the transmission of digitized radio data samples, called samples, to a plurality of recipient antenna controller devices identified by a respective plurality of controller identifiers, the digital antenna signal processing method comprising the following steps:

obtaining of the samples, identification of their respective controller device, multiplexing of the samples in first digitized radio data frames, called first data frames, insertion in the first data frames of the recipient controller identifiers corresponding to the multiplexed samples, transmission of the first frames to the plurality of antenna controller devices via a first data link to the plurality of recipient antenna controller devices.

According to one aspect of the invention, the identification step of the digital antenna signal processing method comprises the following steps for each of the samples of a given first data frame:

identification of a frequency band associated with each sample;

obtaining of a controller identifier corresponding to the identified frequency band.

By virtue of this aspect, it is possible to find the antenna controller device to which each sample has to be handed over.

According to one aspect of the invention, the insertion step of the digital antenna signal processing method comprises the following step for each of the first data frames:

insertion of the recipient controller identifiers corresponding to the multiplexed samples in a field of the first data frames called Vendor Specific in the CPRI standard.

By virtue of this aspect, it is possible to use an existing field in the CPRI standard, and no modification to the CPRI frame is necessary.

The digital antenna signal processing device is capable of implementing the digital antenna signal processing method which has just been described, in all its embodiments.

The various aspects of the invention which have just been described can be implemented independently of one another or in combination with one another.

The invention relates also to a computer program comprising instructions for the implementation of the steps of the switching method which has just been described, when this program is executed by a processor.

The invention further relates to a storage medium that can be read by a switching device, on which is stored the program which has just been described, that can use any programming language, and be in the form of source code, object code, or intermediate code between source code and object code, such as in a partially compiled form, or in any other desirable form.

The invention relates also to a computer program comprising instructions for the implementation of the steps of the digital antenna signal processing method which has just been described, when this program is executed by a processor.

The invention relates finally to a storage medium that can be read by a digital antenna signal processing device, on which is stored the program which has just been described, that can use any programming language, and be in the form of source code, object code, or intermediate code between source code and object code, such as in a partially compiled form, or in any other desirable form.

DESCRIPTION OF THE FIGURES

Other advantages and features of the invention will become more clearly apparent on reading the following description of a particular embodiment of the invention, given as a simple illustrative and nonlimiting example, and the attached drawings, in which:

FIG. 4 presents an exemplary implementation of the digital antenna signal processing method according to one aspect of the invention, FIG. 5 presents an exemplary implementation of the method for switching digitized radio data samples, according to one aspect of the invention.

DETAILED DESCRIPTION OF AT LEAST ONE EMBODIMENT OF THE INVENTION

Hereinafter in the description, examples of a number of embodiments of the invention will be presented based on a transmission system architecture for a base station conforming to the CPRI standard, but the invention applies equally to other transmission system architectures, such as, for example, those using the OBSAI or ORI protocols.

Figure 1:
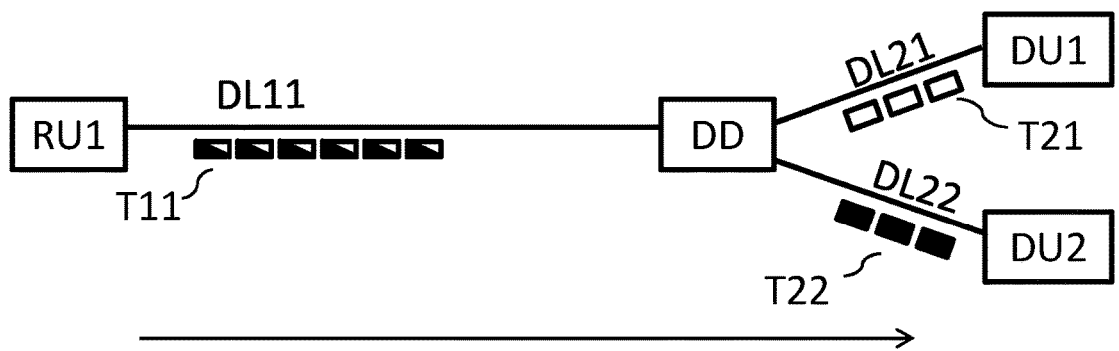
FIG. 1 schematically presents a system for transmitting digitized radio data samples, according to a first embodiment of the invention, FIG. 2 schematically presents a system for transmitting digitized radio data samples, according to a second embodiment of the invention, FIG. 3 schematically presents a system for transmitting digitized radio data samples, according to a third embodiment of the invention.

FIG. 1 schematically presents a system for transmitting digitized radio data samples, according to a first embodiment of the invention.

Using a digital antenna signal processing method which will be described hereinbelow, the antenna device RU1 transmits data frames received by a radio antenna shared between a number of mobile network operators, to the respective control devices of these operators.

In this example, the antenna is shared, and therefore the antenna device RU1 also, between two operators Op1 and Op2, the operators each having their respective control device DU1 and DU2.

In this first embodiment, the antenna device RU1 is connected by a data link DL11 to a switching device DD, which is itself connected to a control device DU1 by a link DL21 and to a device DU2 by a link DL22.

Data frames T11 are transmitted by the antenna device RU1 over the link DL11. Each of these frames can comprise samples of data intended for the two control devices DU1 and DU2. These frames are received by the switching device DD, which, after processing by a switching method which will be described hereinbelow, transmits data frames T21 to the control device DU1 and data frames T22 to the control device DU2. The data frames T21 comprise only samples of data intended for the control device DU1, and the data frames T22 comprise only samples of data intended for the control device DU2.

By virtue of the first data link DL11, the control devices DU1 and DU2 can easily be distanced from the antenna device RU1. By virtue of the respective second data links DL21 and DL22, they further operate as if they were each connected by a dedicated data link to a dedicated antenna, that is to say, a non-shared antenna.

Figure 2:
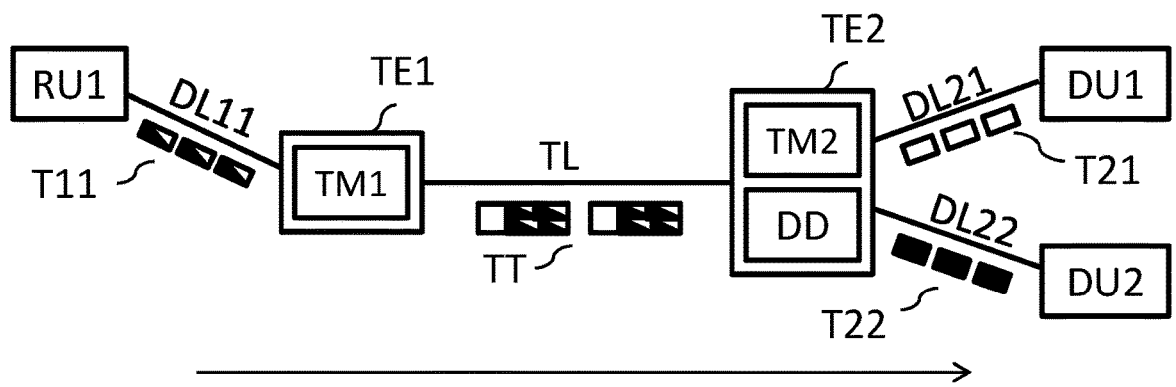

FIG. 2 schematically presents a system for transmitting digitized radio data samples, according to a second embodiment of the invention.

In this second embodiment, a transport link TL is inserted between the first data link DL11 and the second data links DL21 and DL22, by virtue of two transport modules TM1 and TM2 each comprised respectively in an entry point equipment item TE1 and an exit point equipment item TE2 of one and the same transport network.

At the entry to the transport network, the transport module TM1 encapsulates the data frames T11 transmitted by the antenna device RU1 in transport frames TT, according to a format dependent on the type of transport protocol used, for example Ethernet or G.709 ODN.

At the exit from the transport network, the transport module TM2 receives the frames TT and de-encapsulates them in order to hand over the data frames T11 to the switching device DD.

Advantageously, the location of the switching device can thus be chosen with more flexibility, and the distance can be increased relative to the antenna device, while using an existing transport network.

Figure 3:
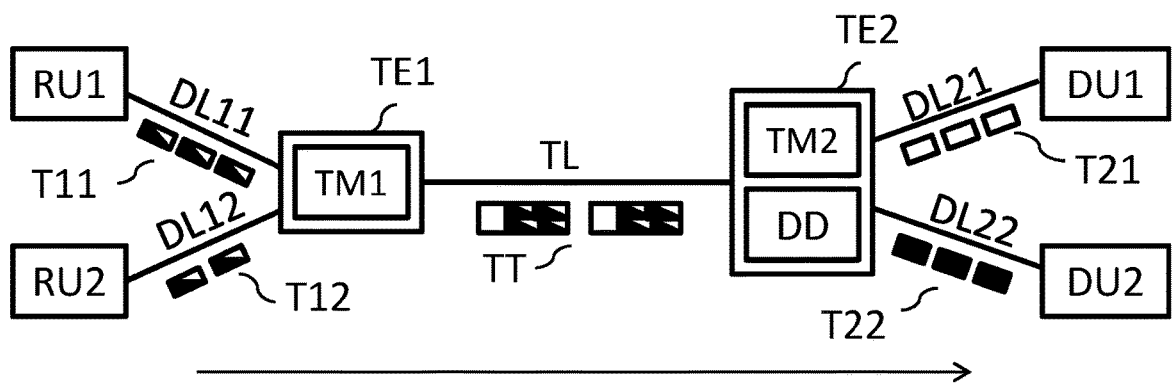

FIG. 3 schematically presents a system for transmitting digitized radio data samples, according to a third embodiment of the invention.

This third embodiment differs from the second in that each of the operator control devices can control a number of shared antennas.

In this example, two antennas are shared, and therefore the antenna devices RU1 and RU2 also, between two operators Op1 and Op2, the operators each having their respective control device DU1 and DU2.

The antenna device RU2 is connected by a data link DL12 to the transport module TM1.

At the entry to the transport network, the transport module TM1 encapsulates, in transport frames TT, the data frames T11 and T12 transmitted respectively by the antenna devices RU1 and RU2 through the data links DL11 and DL12 without distinguishing the frames T11 and T12 from one another.

At the exit from the transport network, the transport module TM2 receives the frames TT and de-encapsulates them in order to hand over the data frames T11 and T12 to the switching device DD.

By virtue of the combination of the links DL11, DL12, DL21, DL22, with the switching device DD, each control device DU1 or DU2 operates as if it controlled two antennas which were exclusively dedicated to it.

By virtue of the transport link TL, great flexibility is allowed in the locating of the antenna devices and of the control devices relative to one another.

FIG. 4 presents an exemplary implementation of the digital antenna signal processing method, according to one aspect of the invention. Referring to FIGS. 1, 2 and 3, this method is implemented by an antenna device such as the devices RU1 and RU2.

In a step E101, the antenna device RU1 obtains samples of data formatted in the form of AxC samples according to the CPRI standard.

In a step E102, the antenna device RU1 obtains, for each of these samples, an identifier which will subsequently enable it to address the data contained in the samples to the correct destination. This identifier can be associated with a range of radio frequencies used by the antenna for a specific operator, Op1 or Op2, or be associated directly with one of these operators. In the first case, the step E102 comprises a substep E103 of identification of the range of radio frequencies used for the data sample, and a substep E104 of obtaining of the identifier of the operator to which this range of radio frequencies has been assigned. Alternatively, the identifier can be the MAC address or the IP address of the antenna controller device to which the data have to be addressed, and/or a logical port of this device, it being understood that the antenna controller device corresponds uniquely to a single operator. It will be understood that whatever the identifier used, it must have the characteristic of being able to uniquely identify the recipient antenna controller device of a data sample, that is to say DU1 or DU2.

In a step E105, the antenna device RU1 multiplexes the samples in first data frames T11, in any order, which can be that in which they are obtained.

In a step E106, the antenna device RU1 inserts into each of the frames T11 the identifiers obtained in the step E102, so that it is possible to associate the correct identifier with each sample contained in the frame. In the general case where the data frame T11 is a frame of CPRI type, the step E106 can to this end comprise a substep E107 of insertion of the identifiers in a field of the frame reserved for this purpose, or available. Such a field can be the "Vendor Specific" field. In order to avoid the unnecessary repetition of identical identifiers corresponding to consecutive samples, this field can comprise pointers at the places where the AxC change identifier in the frame.

In a step E108, the antenna device RU1 transmits over a single link DL11 the data frames T11, to a switching device DD, to which the recipient antenna controller devices DU1 and DU2 are connected.

In the third embodiment described with reference to FIG. 3, the antenna device RU2 implements this method by performing the same steps, the method ending with the transmission of frames T12 over the link DL12, to the same switching device DD.

FIG. 5 presents an exemplary implementation of the method for switching digitized radio data samples, according to one aspect of the invention. Referring to FIGS. 1, 2 and 3, this method is implemented by a switching device such as the device DD.

In a step E201, the switching device DD intercepts data frames T11 (and T12 in the case of the third embodiment of the invention). These frames can be obtained either directly from one or more antenna devices such as RU1 or RU2, or from a transport module such as TM2, referring to FIG. 1, 2 or 3.

In a step E202, the switching device DD demultiplexes the data samples of the intercepted data frames.

In a step E203, the switching device DD extracts from the intercepted data frames controller identifiers corresponding to each of the demultiplexed samples.

In a step E204, the switching device DD groups the demultiplexed samples by controller identifier.

In a step E205, the switching device DD remultiplexes the samples by group in new data frames, a new data frame being associated with a single controller identifier. There is therefore no longer a need to insert any controller identifier in a new data frame.

In a step E206, the switching device DD transmits the new data frames via data links DL21 and DL22 respectively to the recipient controller devices DU1 and DU2, by switching them over the correct link as a function of the group of samples from which each new frame is remultiplexed.

The different embodiments of the invention which have just been described can be combined together.

Figure 6:
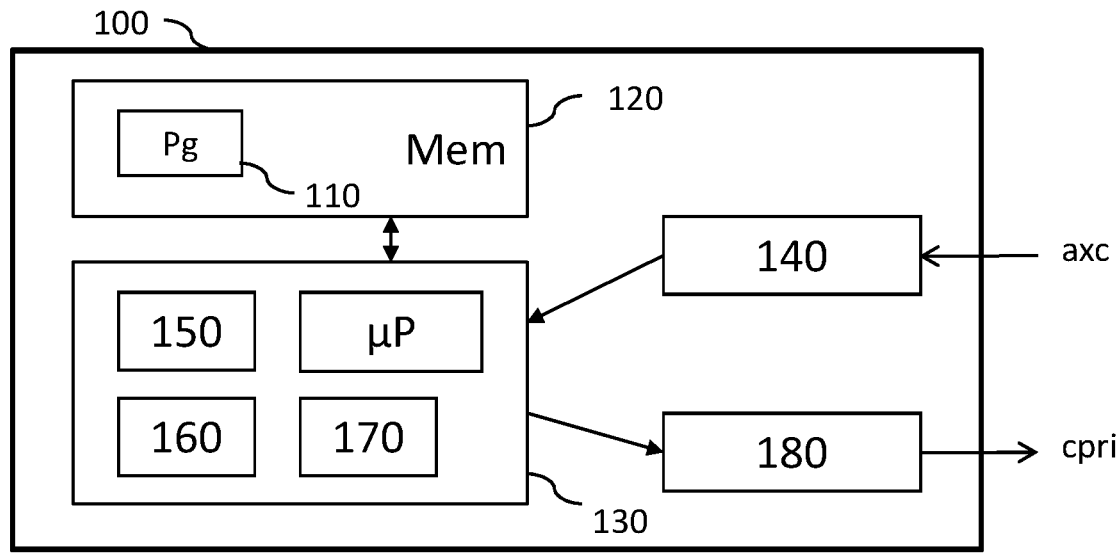
FIG. 6 presents an exemplary structure of a digital antenna signal processing device, according to one aspect of the invention.

FIG. 6 presents an exemplary structure of a digital antenna signal processing device, according to one aspect of the invention.

The digital antenna signal processing device 100 implements the digital antenna signal processing method, of which different embodiments have just been described.

Such a device 100 can be implemented in a base station equipment item, such as a remote radio head.

For example, the device 100 comprises a processing unit 130, equipped for example with a microprocessor μP, and driven by a computer program 110, stored in a memory 120 and implementing the digital antenna signal processing method according to the invention. On initialization, the code instructions of the computer program 110 are for example loaded into a RAM memory, before being executed by the processor of the processing unit 130.

Such a device 100 comprises:
- an obtaining module 140, capable of obtaining, from a radio signal digitization module included in the antenna device, digitized radio data samples (axc) associated with a frequency band,
- an identification module 150, capable of obtaining a control device or operator identifier from a sample of digitized radio data,
- a multiplexing module 160, capable of multiplexing the samples in a data frame,
- an insertion module 170, capable of inserting the identifiers corresponding to the samples of the frame in a data frame,
- a transmission module 180, capable of transmitting the data frames (cpri) to a switching device.

Figure 7:
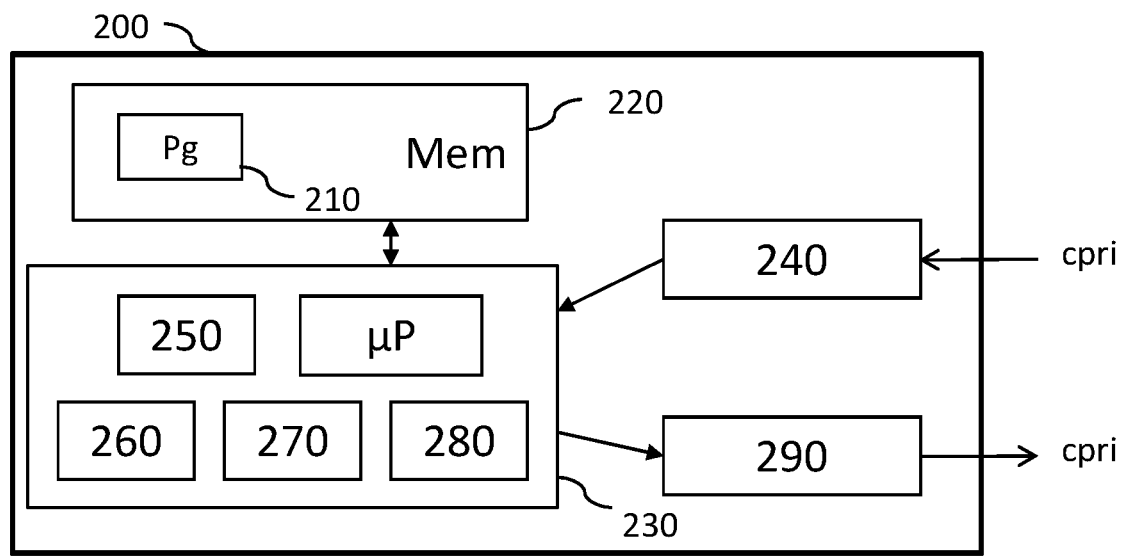
FIG. 7 presents an exemplary structure of a device for switching digitized radio data samples, according to one aspect of the invention.

FIG. 7 presents an exemplary structure of a switching device for digitized radio data samples, according to one aspect of the invention.

The switching device 200 implements the switching method, of which different embodiments have just been described.

Such a device 200 can be implemented in a transport equipment item, such as an Ethernet router, or in an optical switch of ODN type.

For example, the device 200 comprises a processing unit 230, equipped for example with a microprocessor μP, and driven by a computer program 210, stored in a memory 220 and implementing the switching method according to the invention. On initialization, the code instructions of the computer program 210 are for example loaded into a RAM memory, before being executed by the processor of the processing unit 230.

Such a device 200 comprises:
- an interception module 240, capable of intercepting, from the digital antenna signal processing device or a transport device, data frames (cpri),
- a demultiplexing module 250, capable of demultiplexing samples of a data frame,
- an extraction module 260, capable of extracting from a data frame identifiers corresponding to the samples of the frame,
- a grouping module 270, capable of grouping together the demultiplexed samples by identifier,
- a multiplexing module 280, capable of multiplexing the samples by group in a data frame,
- a transmission module 290, capable of transmitting the data frames (cpri) to a plurality of antenna controller devices.

The modules described in relation to FIGS. 6 and 7 can be hardware or software modules.

The exemplary embodiments of the invention which have just been presented are only a few of the embodiments that can be envisaged. They show that the invention makes it possible to connect a plurality of antennas shared between a number of operators to a plurality of antenna controller devices, each antenna controller device being associated with a single operator, while using an existing protocol, by benefiting from great flexibility in the choices of location and distancing of the controller devices relative to the antennas, and without requiring any modification of the latter devices.

These examples show how the invention can be produced in the uplink direction, that is to say from the antenna device or devices to the controller devices.

In the downlink direction when there is only a single antenna device, it is sufficient for the switching device to also comprise a module for receiving the data frames from each of the data links associated with the controller devices, and a module for transmitting these frames unmodified to the data link associated with the antenna device.

When there are a number of antenna devices, a downlink switching device, similar to the uplink switching device which has just been described, can also be used. It differs therefrom simply by the extraction module, which extracts identifiers associated with the antenna devices, and not identifiers associated with the controller devices.

This downlink switching device can be included in the equipment item TE1 referring to FIG. 3, in the case where a transport link is used to increase the range of the transmission system according to the invention. It can also be included in the same communication equipment item as that comprising the uplink switching device.

The invention claimed is:

1. A digital antenna signal processing device, called antenna device, transmitting in common public radio interface (CPRI) frames digitized radio data samples, called samples, to a plurality of recipient antenna controller devices identified by a respective plurality of controller identifiers, wherein the antenna device comprises a microprocessor configured for implementing the following modules:
   obtaining of the samples,
   identification of their respective controller device,
   multiplexing of the samples in first CPRI frames,
   insertion in the first CPRI frames of the recipient controller identifiers corresponding to the multiplexed samples, wherein the insertion comprises the following for each of the first CPRI frames:
      insertion of the recipient controller identifiers corresponding to the multiplexed samples in a field of the first CPRI frames called Vendor Specific,
   transmission of the first CPRI frames to the plurality of antenna controller devices via a first data link to the plurality of recipient antenna controller devices.

2. A transmission system for digitized radio data samples called samples, between at least one digital antenna processing device, called antenna device, and a plurality of recipient antenna controller devices identified respectively by a controller identifier, wherein the system comprises at least one antenna device transmitting in common public radio interface (CPRI) frames digitized radio data samples, called samples, to a plurality of recipient antenna controller devices identified by a respective plurality of controller identifiers, wherein the antenna device comprises the following modules:
- obtaining of the samples,
- identification of their respective controller device,
- multiplexing of the samples in first CPRI frames,
- insertion in the first CPRI frames of the recipient controller identifiers corresponding to the multiplexed samples, wherein the insertion comprises the following for each of the first CPRI frames:
  - insertion of the recipient controller identifiers corresponding to the multiplexed samples in a field of the first CPRI frames called Vendor Specific,
- transmission of the first CPRI frames to the plurality of antenna controller devices via a first data link to the plurality of recipient antenna controller devices; and one switching device for switching digitized radio data samples, transmitted in CPRI frames by a digital antenna signal processing device called antenna device, through a first data link, to a plurality of recipient antenna controller devices identified by a respective plurality of controller identifiers, wherein the switching device comprises the following modules:
- interception of first CPRI frames from the antenna device and intended for the plurality of controller devices, the first CPRI frames comprising the samples,
- demultiplexing of the samples of the intercepted first CPRI frames,
- extraction of the controller identifiers inserted by the antenna device, from the intercepted first CPRI frames,
- grouping together of the demultiplexed samples by controller identifier,
- multiplexing of the samples by group in second CPRI frames, a second CPRI frame being associated with a controller identifier,
- transmission of the second CPRI frames via a plurality of second data links associated respectively with the plurality of recipient antenna controller devices.

3. The transmission system as claimed in claim 2, comprising first and second transport modules, the first transport module being arranged to:
- receive the first CPRI frames through at least one first data link,
- encapsulate the first CPRI frames in transport frames,
- transmit the transport frames to the second transport module through a transport link, and the second transport module being arranged to:
- receive the transport frames through the transport link,
- obtain the first CPRI frames by de-encapsulation from the transport frames,
- deliver the de-encapsulated first CPRI frames to the switching device.

4. A digital antenna signal processing method, for the transmission in common public radio interface (CPRI) frames of digitized radio data samples, called samples, to a plurality of recipient antenna controller devices identified by a respective plurality of controller identifiers, wherein the digital antenna signal processing method comprises the following steps:
- obtaining of the samples,
- identification of their respective controller device,
- multiplexing of the samples in first in common public radio interface (CPRI) frames,
- insertion in the first CPRI frames of the recipient controller identifiers corresponding to the multiplexed samples, wherein the insertion comprises the following for each of the first CPRI frames:
  - insertion of the recipient controller identifiers corresponding to the multiplexed samples in a field of the first CPRI frames called Vendor Specific,
- transmission of the first CPRI frames to the plurality of antenna controller devices via a first data link to the plurality of recipient antenna controller devices.

5. The digital antenna signal processing method as claimed in claim 4, wherein the identification step comprises the following steps for each of the samples of a given first CPRI frame:
- identification of a frequency band associated with each sample;
- obtaining of a controller identifier corresponding to the identified frequency band.

6. A computer program, stored on a non-transitory computer readable medium, the computer program comprising instructions for implementation of steps of a digital antenna signal processing method, when this digital antenna signal processing method is executed by a processor, the digital antenna signal processing method for the transmission in common public radio interface (CPRI) frames of digitized radio data samples, called samples, to a plurality of recipient antenna controller devices identified by a respective plurality of controller identifiers, wherein the digital antenna signal processing method comprises the following steps:
- obtaining of the samples,
- identification of their respective controller device,
- multiplexing of the samples in first in common public radio interface (CPRI) frames,
- insertion in the first CPRI frames of the recipient controller identifiers corresponding to the multiplexed samples, wherein the insertion comprises the following for each of the first CPRI frames:
  - insertion of the recipient controller identifiers corresponding to the multiplexed samples in a field of the first CPRI frames called Vendor Specific,
- transmission of the first CPRI frames to the plurality of antenna controller devices via a first data link to the plurality of recipient antenna controller devices.

* * * * *